(12) United States Patent
Mak

(10) Patent No.: US 9,103,491 B2
(45) Date of Patent: Aug. 11, 2015

(54) ELECTRONIC PRODUCT CARRIER ADAPTED TO BE HUNG ON A NECK

(71) Applicant: GLISTEN GARMENT LTD, Hong Kong (HK)

(72) Inventor: Ka Chun Mak, Hong Kong (HK)

(73) Assignee: Glisten Garment Ltd., Hong Kong (HK)

( * ) Notice: Subject to any disclaimer, the term of this patent is extended or adjusted under 35 U.S.C. 154(b) by 59 days.

(21) Appl. No.: 13/954,997

(22) Filed: Jul. 31, 2013

(65) Prior Publication Data

US 2015/0034685 A1    Feb. 5, 2015

(51) Int. Cl.
| | |
|---|---|
| A45F 5/00 | (2006.01) |
| F16M 13/04 | (2006.01) |
| A45F 3/14 | (2006.01) |
| F16M 11/08 | (2006.01) |
| F16M 11/20 | (2006.01) |
| F16M 11/24 | (2006.01) |
| F16M 13/02 | (2006.01) |

(52) U.S. Cl.
CPC ............ *F16M 13/04* (2013.01); *A45F 3/14* (2013.01); *F16M 11/08* (2013.01); *F16M 11/2021* (2013.01); *F16M 11/24* (2013.01); *F16M 13/022* (2013.01); *A45F 5/00* (2013.01); *A45F 2200/0516* (2013.01); *A45F 2200/0525* (2013.01); *F16M 2200/022* (2013.01)

(58) Field of Classification Search
USPC ......... 224/185, 623, 625, 646, 259, 262, 261, 224/265, 270, 930
See application file for complete search history.

(56) References Cited

U.S. PATENT DOCUMENTS

| 2,603,134 | A | * | 7/1952 | Burnam ................... 224/185 |
| 2,863,256 | A | * | 12/1958 | Hegarty .................. 248/444 |
| 5,220,704 | A | * | 6/1993 | Flynn et al. ............... 15/321 |
| 6,349,864 | B1 | * | 2/2002 | Lee .......................... 224/270 |
| 6,359,609 | B1 | * | 3/2002 | Kuenster et al. .......... 345/156 |
| 6,541,976 | B1 | * | 4/2003 | Dorren ..................... 324/326 |
| 7,665,641 | B2 | * | 2/2010 | Kaufman .................. 224/261 |
| 7,681,855 | B1 | * | 3/2010 | Cashman et al. ....... 248/441.1 |
| 8,418,900 | B1 | * | 4/2013 | Baker ....................... 224/262 |
| 8,505,790 | B2 | * | 8/2013 | Yu et al. ................... 224/185 |

(Continued)

FOREIGN PATENT DOCUMENTS

| JP | 2011244410 A | 12/2011 |
| KR | 20100020296 A | 2/2010 |
| KR | 20100110212 A | 10/2010 |

OTHER PUBLICATIONS

International Search Report issued by the State Intellectual Property Office of P. R. C. In connection with PCT Application No. PCT/CN2013/080460 on May 21, 2014.

*Primary Examiner* — Justin Larson
(74) *Attorney, Agent, or Firm* — Wendy K. Marsh

(57) ABSTRACT

An electronic product carrier adapted to be hung on a neck including a base, a bar having a distal bar section and a proximal bar section connected to the base by a connecting band, a plate assembly connected to the distal bar section and having a rotatable plate for mounting thereon an electronic product, and a neck cord adapted to be connected to the base, the bar or the connecting band. The bar further includes additional bar sections. The plate assembly includes a hinge hingedly connected to and frictionally engaged with the distal bar section, and a plate support connected to the hinge. The rotatable plate is rotatably mounted on and frictionally engaged with the plate support.

20 Claims, 14 Drawing Sheets

(56) References Cited

U.S. PATENT DOCUMENTS

D697,708 S * 1/2014 Denzer et al. .................. D3/215
2004/0180631 A1 * 9/2004 Lim et al. ..................... 455/90.3
2004/0211799 A1 * 10/2004 Loughman .................... 224/262
2007/0164987 A1 * 7/2007 Graham ........................ 345/156
2010/0025444 A1 * 2/2010 Tipton et al. .................. 224/576
2011/0297720 A1 * 12/2011 Yu et al. ........................ 224/623
2012/0217852 A1 * 8/2012 Yu ............................... 312/223.1
2013/0214022 A1 * 8/2013 Harvey ......................... 224/623

* cited by examiner

ELECTRONIC PRODUCT CARRIER ADAPTED TO BE HUNG ON A NECK

FIELD OF THE TECHNOLOGY

The present application is directed to an electronic product carrier, and specifically to an electronic product carrier adapted to be hung on the neck of a user so that an electronic product such as a mobile phone or a tablet PC can be held in front of the user without using his/her hands.

BACKGROUND

Portable electronic products such as mobile phones and tablet PCs are widely used and have become indispensable necessities for people. Electronic products such as mobile phones or tablet PCs provide people with entertainment, information and communication, etc. As the demand for the most current information, entertainment and communication increases, electronic products such as mobile phones and tablet PCs gradually become inseparable from people. However, using these electronic products such as mobile phones or tablet PCs for a long period of time may cause hand, arm, and shoulder stress, and may further cause body and muscle injury. When a user holds an electronic product such as a mobile phone or a tablet PC, the hands of the user are occupied and the user cannot simultaneously perform other tasks such as holding an umbrella, searching for wallet to make payment, etc. This leads to a lot of inconvenience and can easily cause the mobile phones or tablet PCs to drop on the ground negligently and result in damage of the electronic product.

SUMMARY

The present patent application is directed to an electronic product carrier adapted to be hung on a neck. The electronic product carrier includes a base having a trough provided thereon; a bar having a distal bar section and a proximal bar section connected to the base by a connecting band, the proximal bar section being removably inserted into the trough, the bar further comprising additional bar sections and a bar adjusting mechanism for adjusting the length of the bar; a plate assembly connected to the distal bar section and having a rotatable plate for mounting thereon an electronic product, the plate assembly comprising a hinge hingedly connected to and frictionally engaged with the distal bar section, and a plate support being connected to the hinge, and the rotatable plate being rotatably mounted on and frictionally engaged with the plate support; and a neck cord adapted to be connected to the base, the bar or the connecting band. The base includes a base extension provided inside the base, the base extension can be retracted inside the base or extended outward from the base by a base support adjusting mechanism specify "a base support adjusting mechanism" may make. One or more windows are provided on the bar and/or the rotatable plate as well as the base and/or the connecting band, and each window is in the form of an opening or a transparent window, which corresponds to a peripheral device of the electronic product.

BRIEF DESCRIPTION OF THE DRAWINGS

Below is a further description of the present application with drawings and embodiments, in the drawings.

DETAILED DESCRIPTION

In order to have a clearer understanding on the technical feature, purpose and effect of the present application, below is a detailed description of the specific embodiments of the present application with reference to the drawings.

FIGS. 1 to 6 are illustrative diagrams of an electronic product carrier 10 adapted to be hung on a neck of a first embodiment of the present application. The electronic product carrier 10 can be hung on the neck of a person, and an electronic product such as a mobile phone or a tablet PC can be placed on the electronic product carrier 10. With the help of the electronic product carrier 10, the user does not need to use his/her hands to hold the mobile phone or the tablet PC when in use.

Figure 1:
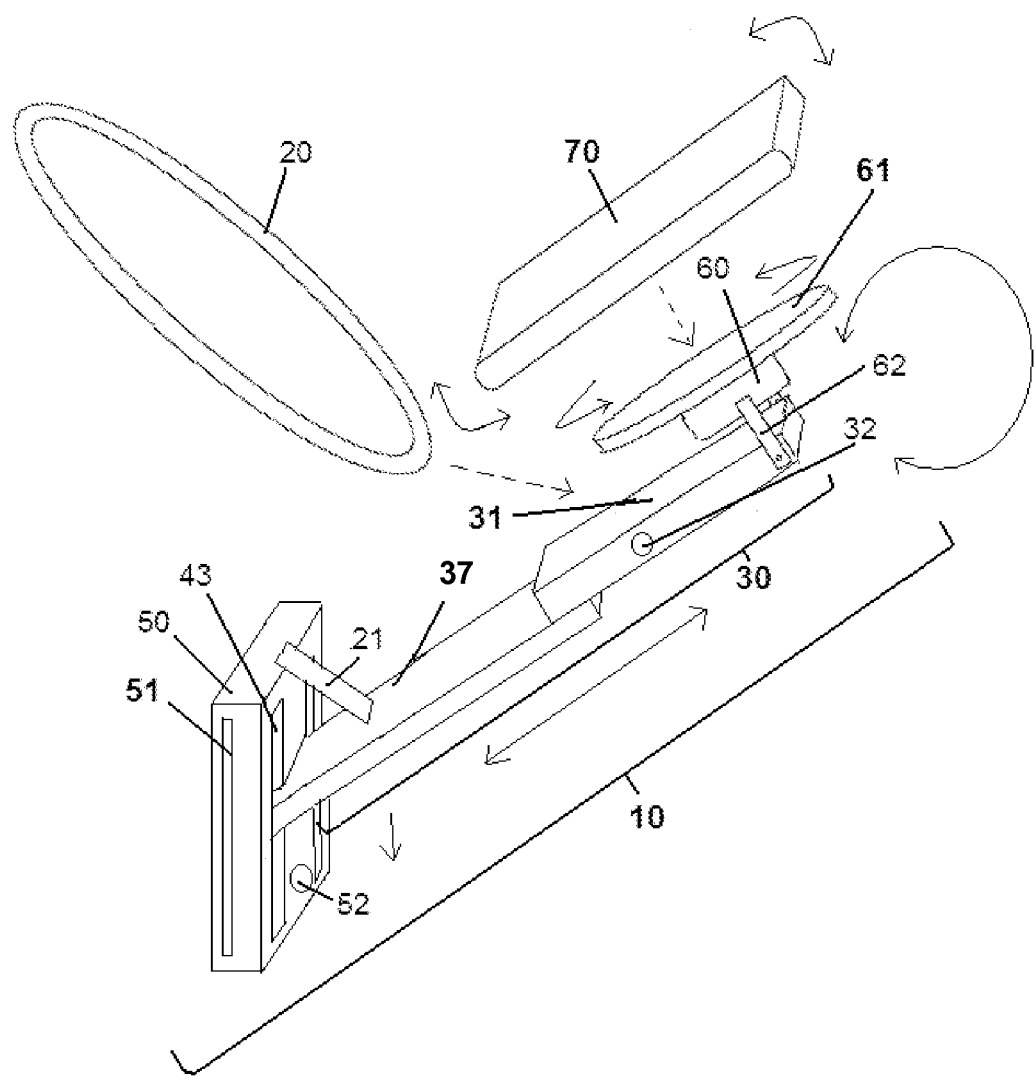
FIG. 1 is an illustrative diagram of a first embodiment of a partially disassembled electronic product carrier adapted to be hung on a neck of the present application.
Figure 2:
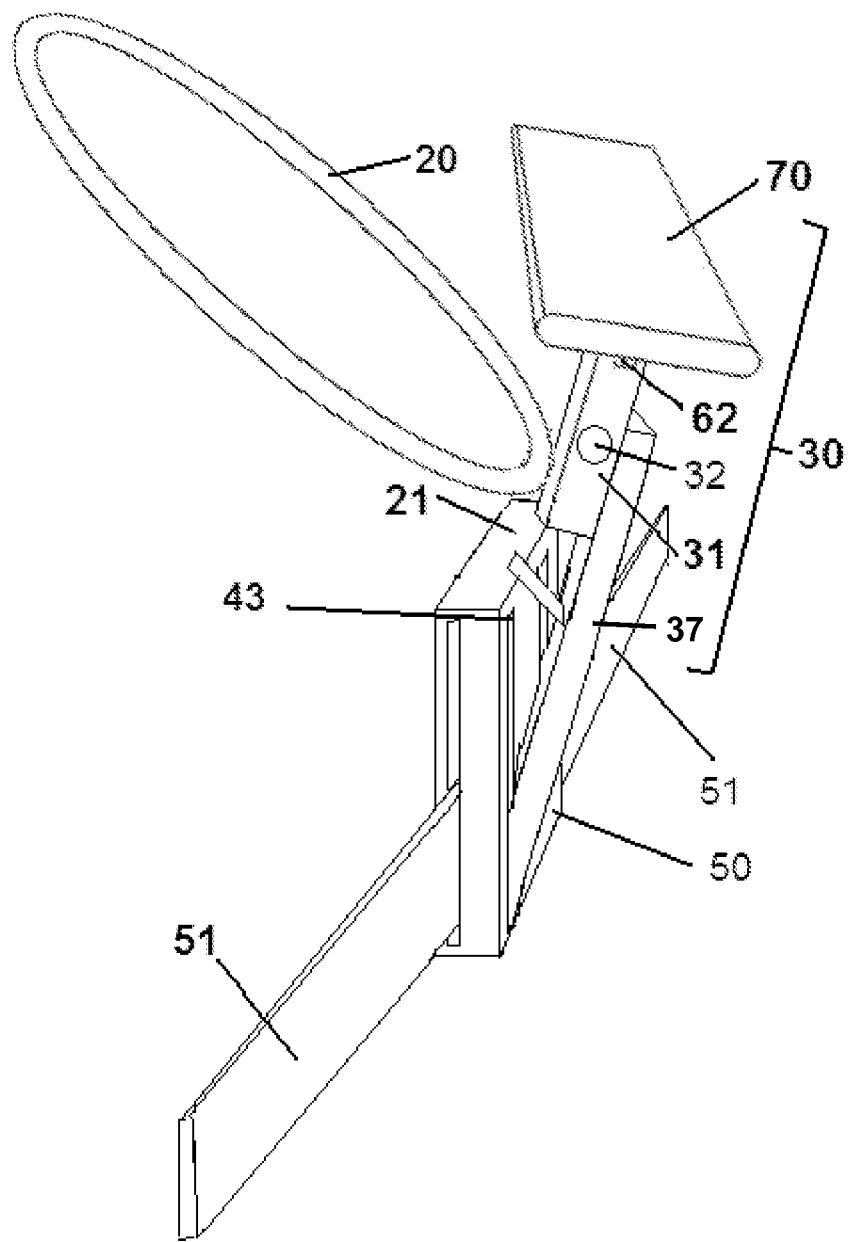
FIG. 2 is an illustrative diagram of an outwardly extending base extension of the first embodiment of the electronic product carrier adapted to be hung on a neck of the present application.
Figure 6:
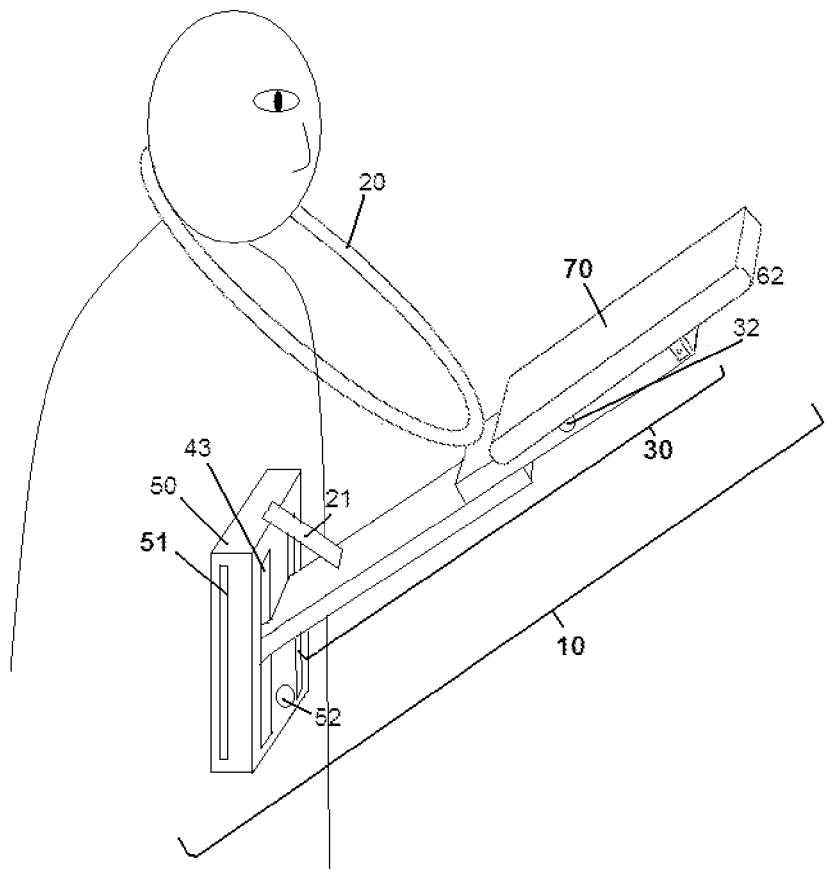
FIG. 6 is an illustrative diagram of the first embodiment of the electronic product carrier adapted to be hung on a neck of the present application in use by a user.

Referring to FIGS. 1, 2 and 6, the electronic product carrier 10 of the present embodiment may include a base 50, a length-adjustable rod or bar 30, a plate assembly and a neck cord 20. The plate assembly may include a hinge 62, a plate support 60 and a rotatable plate 61. A connecting band 21 may be connected to the bar 30. One end of the connecting band 21 may be connected to the base 50 or the neck cord 20, while the other end may be connected to the bar 30. A first or distal bar section 31 of the bar 30 may be hingedly connected to the hinge 62 of the plate assembly. A second or proximal bar section 37 of the bar 30 may be detachably connected to the base 50. One end of the neck cord 20 can be hung on the neck of the user, while another end of the neck cord 20 can be connected to the bar 30, a top end of the base 50, or the connecting band 21. In the present embodiment, the neck cord 20 is connected to the bar 30.

Referring to FIGS. 1, 2, 3 and 6, the base 50 of the present embodiment may be provided with a trough 43. The proximal bar section 37 of the bar 30 can be detachably coupled with the trough 43. Since one end of the connecting band 21 is connected to the base 50, while the other end is connected to the bar 30, after the proximal bar section 37 of the bar 30 is inserted into the trough 43, the bar 30 can be maintained in an outwardly extending configuration, allowing the mobile phone or tablet PC to be placed on the plate assembly so that it is not required the use of the hands to hold the mobile phone or tablet PC in front of the user. When the bar 30 does not require to be extended outwardly, the proximal bar section 37 of the bar 30 can be released from the trough 43 of the base 50, allowing the bar 30 to revert to a downward position thereby preventing the obstruction of the activity of the user. The proximal bar section 37 of the bar 30 can be connected to different locations of the trough 43 on the base 40. Through connecting at different locations, the angle between the bar 30 and the base 50 can be adjusted so as to adjust the position and angle of the mobile phone or tablet PC on the plate assembly, so that the usage of the electronic product carrier 10 by the user can be enhanced.

Referring to FIGS. 1, 2, 3 and 4, the length of the bar 30 of the electronic product carrier 10 can be adjusted. The bar 30 may include two or more bar sections 31. A plurality of bar sections 31 can form into the bar 30, and the bar sections 31 can be disposed in a nested or stacked configuration. In the present embodiment, the bar sections 31 may be disposed in a stacked configuration. The plurality of bar sections 31 can be pulled out and extended, or retracted and stacked together. The length of the bar 30 can be changed by changing the relative positions of the bar sections 31. When the bar sections 31 are fully pulled out, the length of the bar 30 is the longest. When the bar sections 31 are fully retracted, the length of the bar 30 is the shortest. The length of the bar 30 can be adjusted between the longest and the shortest lengths. A bar adjusting mechanism 32 can be provided on the bar 30. This bar adjusting mechanism 32 can be a common mechanism such as a press button, dial button, push button or any other possible mechanism. The user presses the bar adjusting mechanism 32 and the bar 30 would be in a length-adjustable configuration and can be free to move. Through pulling out the bar sections 31 and retracting the bar sections 31, the required length of the bar 30 can be reached. When the bar adjusting mechanism 32 is released, the length of the bar 30 can be maintained.

Figure 5:
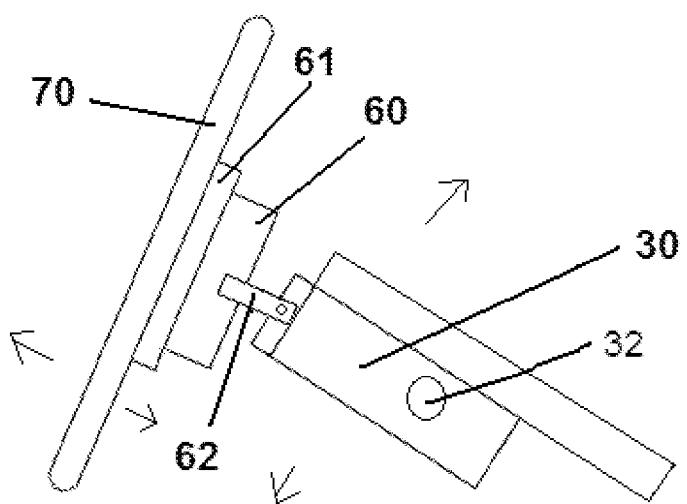
FIG. 5 is an illustrative diagram of the first embodiment of the electronic product carrier adapted to be hung on a neck of the present application in use on a flat surface.

Referring to FIGS. 1, 2 and 5, the distal bar section 31 of the bar 30 may be connected to the plate assembly. The plate assembly may include a hinge 62, a plate support 60 and a rotatable plate 61. In particular, the plate support 60 can be connected to the bar 30 through the hinge 62. The angle between the plate support 60 and the bar 30 can be adjusted through the hinge 62, which is hingedly connected to the bar 30. The hinge 62 can possess friction so that it can be frictionally engaged with the bar 30. The user is required to apply a certain amount of force in order to move and adjust the angle of the hinge 62. This can ensure that the angle of the hinge 62 can be adjusted, and can also prevent the hinge 62 from moving by itself when in use. The rotatable plate 61 can be rotated 360° degrees on the plate support 60. The rotatable plate 61 and the plate support 60 may possess friction thereinbetween so that the rotatable plate 61 can be frictionally engaged with the plate support 60. The user is required to apply a certain amount of force in order to move and rotate the rotatable plate 61 so that the rotatable plate 61 can rotate on the plate support 60. After suitable adjustment, the rotatable plate 61 can be maintained in its position and would not rotate by itself. The mobile phone or tablet PC can be detachably connected directly to the rotatable plate 61 by fastening, adhering or any other suitable means. A connecting mechanism may be provided on the rotatable plate 61 for connecting the mobile phone or tablet PC by fastening, adhering, or any other suitable means. Alternatively, a container 70 may be mounted on the rotatable plate 61. The mobile phone or tablet PC can be placed inside the container 70. The container 70 and the rotatable plate 61 can be connected together by any common detachable connection such as fastening, adhering or any other possible detachable connecting method.

Referring to FIGS. 1 and 2, one or more base extensions 51 may be provided inside the base 50. A base extension adjusting mechanism 52 can also be provided on the base 50. The base extension 51 can be retracted inside the base 50 or extended outwardly from the base 50. The base extension adjusting mechanism 52 allows the base extension 51 to interchange between a retracted configuration where the base extension 51 is retracted inside the base 50, and an extended configuration where the base extension 51 is extended outward from the base 50. When no additional support is required, the base extension 51 can be retracted inside the base 50. When additional support is required, the user can actuate the base extension adjusting mechanism 52 and can cause the base extension 51 retracted inside the base 50 to extend outward. This can increase the support area of the base 50 and prevent the situation of shaking sideways due to movement of the user. When the base extension 51 is required to be retracted, the base extension adjusting mechanism 52 can be actuated in opposite direction, causing the base extension 51 to be retracted inside the base 50. The base extension 51 and the base extension adjusting mechanism 52 in this embodiment are merely one example to show the operation concept and location. It is understood that other similar or equivalent structures can be applied to achieve the same result.

Referring to FIGS. 1, 2 and 6, when the electronic product carrier 10 in the present embodiment is in use, the neck cord 20 is hung on the neck of a user and the base 50 may lie on the chest or abdomen of the user. The bar 30 may extend in a slanted upward direction, causing the plate assembly to be located in front of the user. The mobile phone or tablet PC or the container 70 carrying the mobile phone or tablet PC may be situated on the rotatable plate 61 of the plate assembly, allowing the user to view the mobile phone or tablet PC without the need to use the hands to pick up the mobile phone or tablet PC. This can free the hands of the user and allows him/her to perform other tasks while using the mobile phone or tablet PC. Since the length of the bar 30 can be adjusted, the coupling between the proximal bar section 37 of the bar 30 and the trough 43 on the base 50 can be adjusted. The hinge 62 can also be adjusted. The rotatable plate 61 can also rotate on the plate support 60. With the aid of these adjustable structures, the mobile phone or tablet PC or the container 70 carrying the mobile phone or tablet PC can be situated in a position suitable for use by the user. When additional support is needed, the base extension 51 inside the base 50 can be extended outward from the base 50. This can allow the electronic product carrier 10 as a whole to be provided with a more stable support and prevent the shaking of the electronic product carrier 10 during use.

Figure 3:
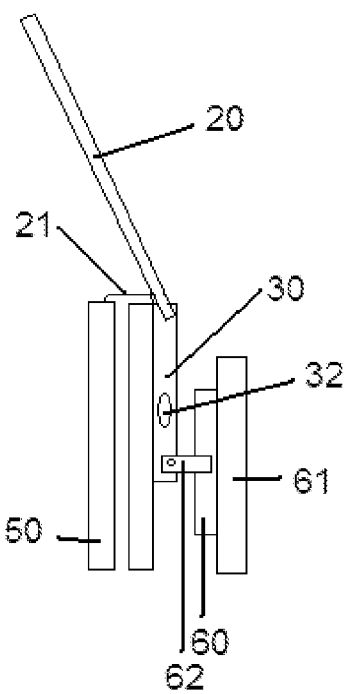
FIG. 3 is an illustrative diagram of the first embodiment of the electronic product carrier adapted to be hung on a neck of the present application in a stacked configuration.

Referring to FIG. 3, when the need of the mobile phone or tablet PC, or the container 70 carrying the mobile phone or tablet PC for viewing in front of the user is no longer required, the electronic product carrier 10 can be retracted. Specifically, the proximal bar section 37 of the bar 30 can be disassembled from the trough 43 of the base 50, and the bar 30 can be retracted to the configuration with the shortest length. The bar 30 would be hanging downwards. The hinge 62 can then be adjusted to allow the plate support 60 and the bar 30 to balance. This way, after the electronic product carrier 10 is retracted, the space occupied by the electronic product carrier 10 can be reduced and therefore it will not interfere with other tasks to be performed by the user. When the electronic product carrier 10 is required to be used, it can be extended outwards again.

Figure 4:
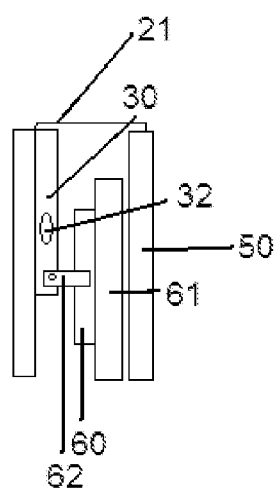
FIG. 4 is an illustrative diagram of the first embodiment of the electronic product carrier adapted to be hung on a neck of the present application in another stacked configuration.

Referring to FIG. 4, besides retracting the electronic product carrier 10 as shown in FIG. 3, the electronic product carrier 10 can be retracted in a way shown in FIG. 4. Specifically, the proximal bar section 37 of the bar 30 can be detached from the trough 43 of the base 50 and the length of the bar 30 is retracted to the shortest. Then, the base 50 can be flipped over and covers the front of the rotatable plate 61, thereby covering the mobile phone or tablet PC or the container 70 carrying the mobile phone or tablet PC. This way the base 50 can provide protection for the mobile phone or tablet PC, and prevent it from colliding with other objects.

Referring to FIG. 5, the electronic product carrier 10 in the present embodiment can be hung on the neck, and can also be placed on a table or other objects having a supporting surface. Specifically, the bar 30 can be detached from the base 50, the hinge 62 can be used to adjust the angle between the rotatable plate 61 and the bar 30. The mobile phone or tablet PC, or the container 70 carrying the mobile phone or tablet PC on the rotatable plate 61 can stand at different angles. This can allow the mounting of the electronic product carrier 10 on a table or other objects having a supporting surface, and allow the electronic product carrier 10 to have more functions and satisfy the demand of use in different situations.

FIGS. 7 to 19 are illustrative diagrams of the electronic product carrier adapted to be hung on a neck according to a second embodiment of the present application. In the present embodiment, the electronic product carrier 10 includes a base 50, a length-adjustable rod or bar 30, a plate assembly, and a neck cord 20. The plate assembly may include a plate support 60 and a rotatable plate 61. One end of the neck cord 20 can be hung on the neck of a user, while the other end of the neck cord 20 can be connected to the bar 30 or a top end of the base 50. In the present embodiment, the neck cord 20 is connected to the bar 30.

Referring to the embodiment in FIGS. 7, 8, 9, 10, 13 and 19, a strut 41 may be provided between the base 50 and the bar 30 of the electronic product carrier 10. The bottom surface of the bar 30 can be provided with a plurality of troughs 43. One end of the strut 41 may be hingedly connected to the base 50; while the other end of the strut 41 can be inserted into one of the troughs 43. Through adjusting the position of the trough 43 being inserted with the end of the strut 41, the angle between the base 50 and the bar 30 can be adjusted according to need. It is understood that one end of the strut 41 can be hingedly connected to the bar 30, and a plurality of troughs 43 can be provided on the base 50 instead. Similarly, through adjusting the strut 30 being inserted into different locations of the troughs 43, the angle between the bar 30 and the base 50 can be adjusted according to need.

Referring to the embodiment in FIGS. 7, 8, 10 and 19, the length of the bar 30 of the electronic product carrier 10 can be adjusted. The structure of the bar 30 of the electronic product carrier 10 in the second embodiment is substantially the same as the structure of the bar 30 in the first embodiment. The bar 30 can be formed from a plurality of bar sections 31 in stacked configuration. When the bar sections 31 are fully pulled out, the length of the bar 30 is the longest. When the bar sections 31 are fully retracted, the length of the bar 30 is the shortest. The length of the bar 30 can be adjusted between the longest and the shortest lengths. A bar adjusting mechanism 32 may be provided on the bar 30. This bar adjusting mechanism 32 can be in the form of a press button, dial button or any other possible mechanism. The user may press the bar adjusting mechanism 32 and the bar 30 is in a configuration where its length can be adjusted. The required length of the bar 30 can be reached by pulling out the bar sections 31 or retracting the bar sections 31, and the bar adjusting mechanism 32 can then be released. The length of the bar 30 can be maintained at that length, thereby allowing the user to adjust the length of the bar 30 according to his/her need.

Figure 7:
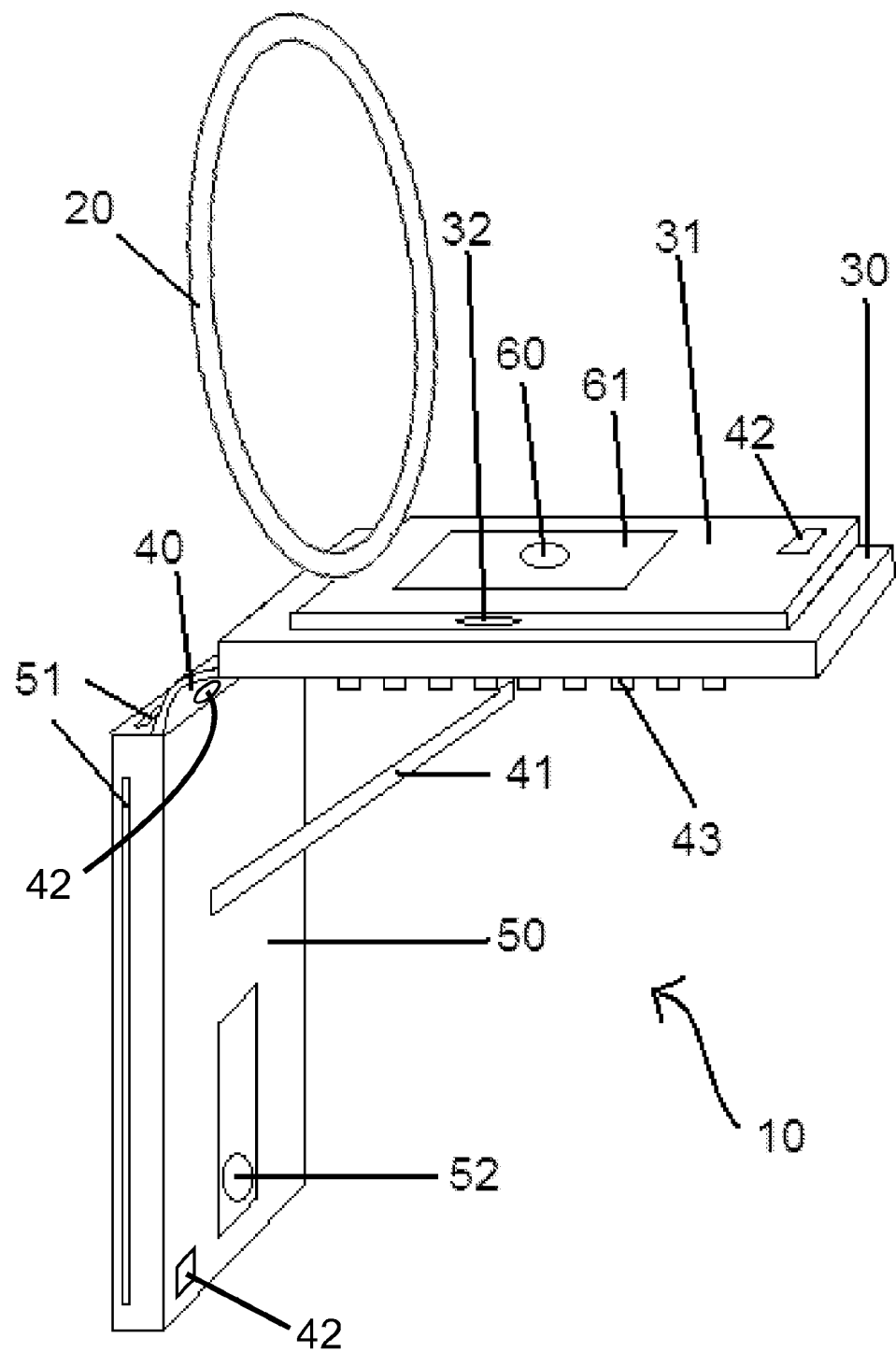
FIG. 7 is an illustrative diagram of a second embodiment of the electronic product carrier adapted to be hung on a neck of the present application.
Figure 8:
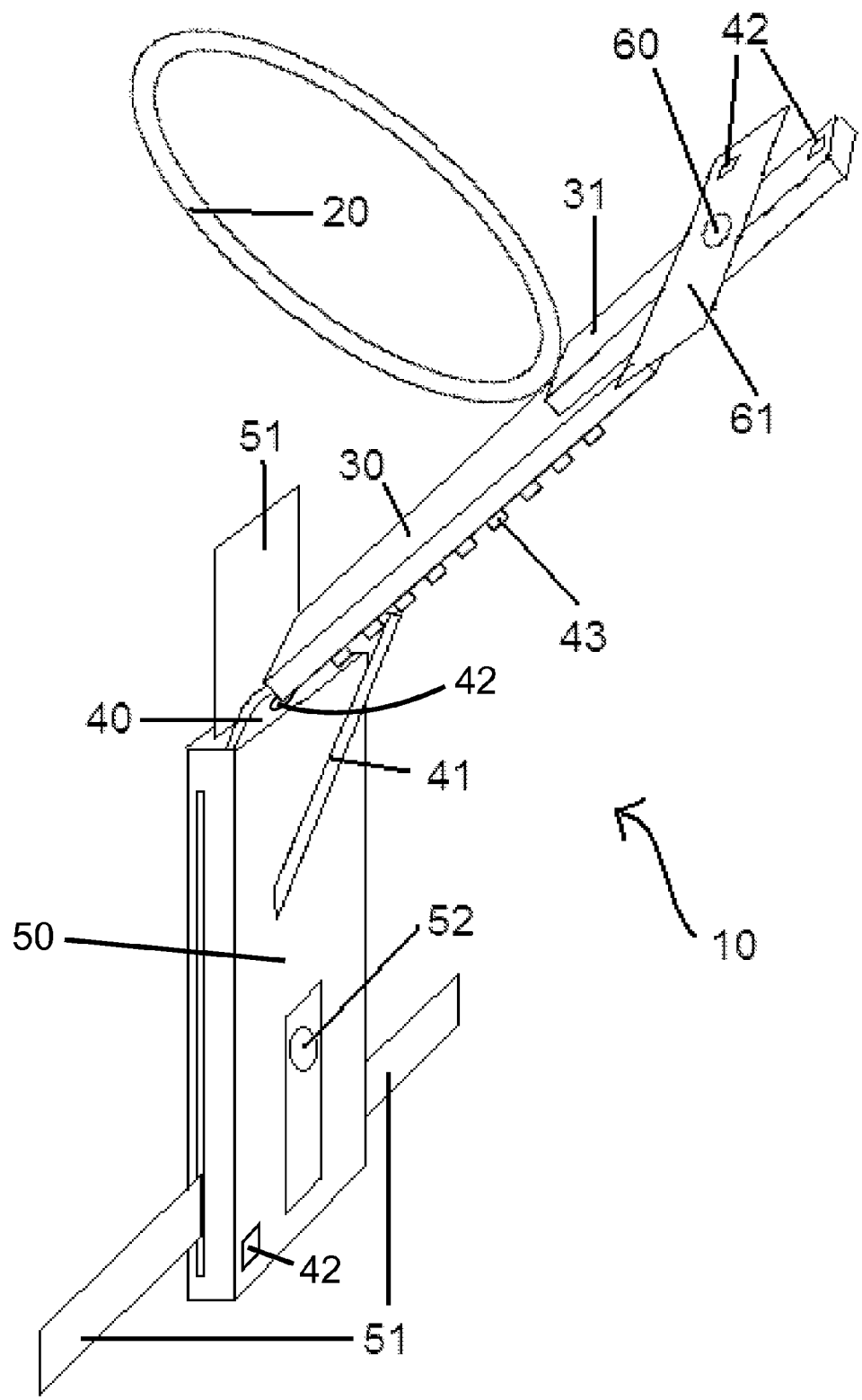
FIG. 8 is an illustrative diagram of the second embodiment of the electronic product carrier adapted to be hung on a neck of the present application when the base extension is extended outwards.
Figure 9:
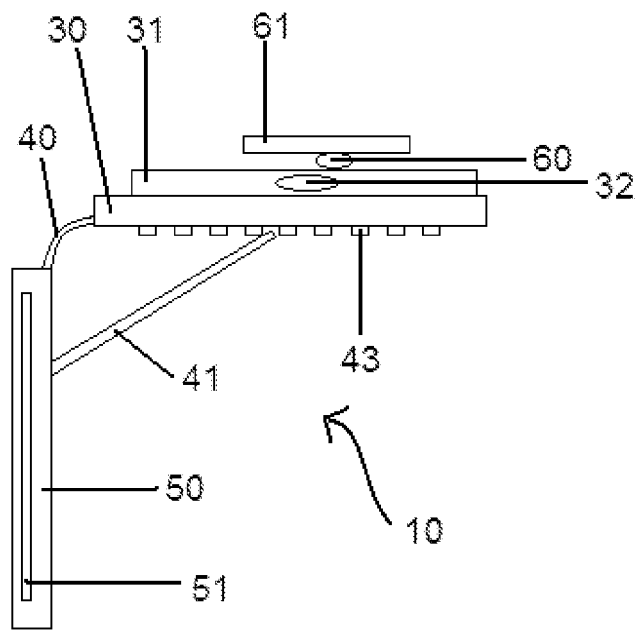
FIG. 9 is side illustrative diagram of a bar and a base at an angle of 270° degrees of the second embodiment of the electronic product carrier adapted to be hung on a neck of the present application.

Referring to FIGS. 7, 8 and 9, a distal bar section 31 of the bar 30 may be connected to a plate assembly. In the present embodiment, the plate assembly includes a plate support 60 and a rotatable plate 61 rotatably connected thereto. The plate support 60 and the bar 30 can be fixedly connected. The rotatable plate 61 can rotate 360° degrees on the plate support 60. The rotation of the rotatable plate 61 can be provided with friction, requiring the user to apply a certain force in order to adjust the rotatable plate 61 so that it can rotate on the plate support 60. After adjustment, the rotatable plate 61 can be maintained at that position by fraction and would not rotate by itself on the plate support 60. The mobile phone or tablet PC can be detachably connected to the rotatable plate 61 by fastening, adhering or any other suitable method. Alternatively, a container 70 can be mounted on the rotatable plate 61. The mobile phone or tablet PC can then be placed inside the container 70. The container 70 and the rotatable plate 61 can be detachably connected together by fastening, adhering or any other suitable method.

Referring to the embodiment in FIGS. 7, 8 and 9, the neck cord 20 of the electronic product carrier 10 may be connected to one of the bar sections 31 at the distal bar section 31 of the bar 30. When the length of the bar 30 increases, the mobile phone or tablet PC would extend forward, and the neck cord 20 would also extend forward following the front end of the bar 30. The center of mass of the electronic product carrier 10 exceeding the location of the connection point between the neck cord 20 and the bar 30 can be prevented. Hence, the possibility of the electronic product carrier 10 losing balance and collapsing outwardly or inwardly due to increase in length and change in the center of mass of the electronic product carrier 10 can be greatly reduced.

Referring to FIGS. 7, 8, 14, 15 and 16, inside the base 50 of the electronic product carrier 10 can be provided with one or more base extensions 51. A base extension adjusting mechanism 52 may also be provided on the base 50. When not required, the base extension 51 can be retracted inside the base 50. When additional support is required, the user can actuate the base extension adjusting mechanism 52, allowing the retracted base extension 51 inside the base 50 to extend outward. This way, the supporting area of the base 50 can be increased and shaking sideways of the electronic product carrier 10 due to movement of the user can be prevented. When the base extension 51 is required to be retracted, the base extension adjusting mechanism 52 can be pushed and the base extension 51 can be retracted inside the base 50.

Figure 10:
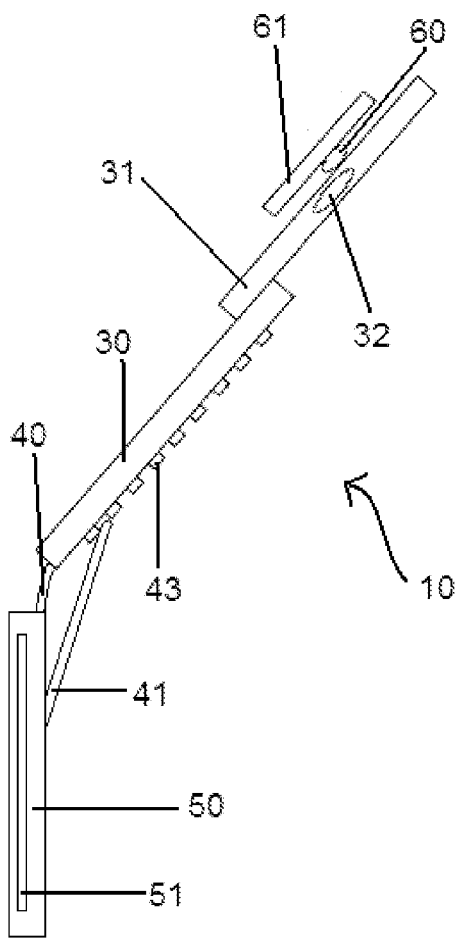
FIG. 10 is side illustrative diagram of the bar and a base at an angle of 240° degrees of the second embodiment of the electronic product carrier adapted to be hung on a neck of the present application.
Figure 11:
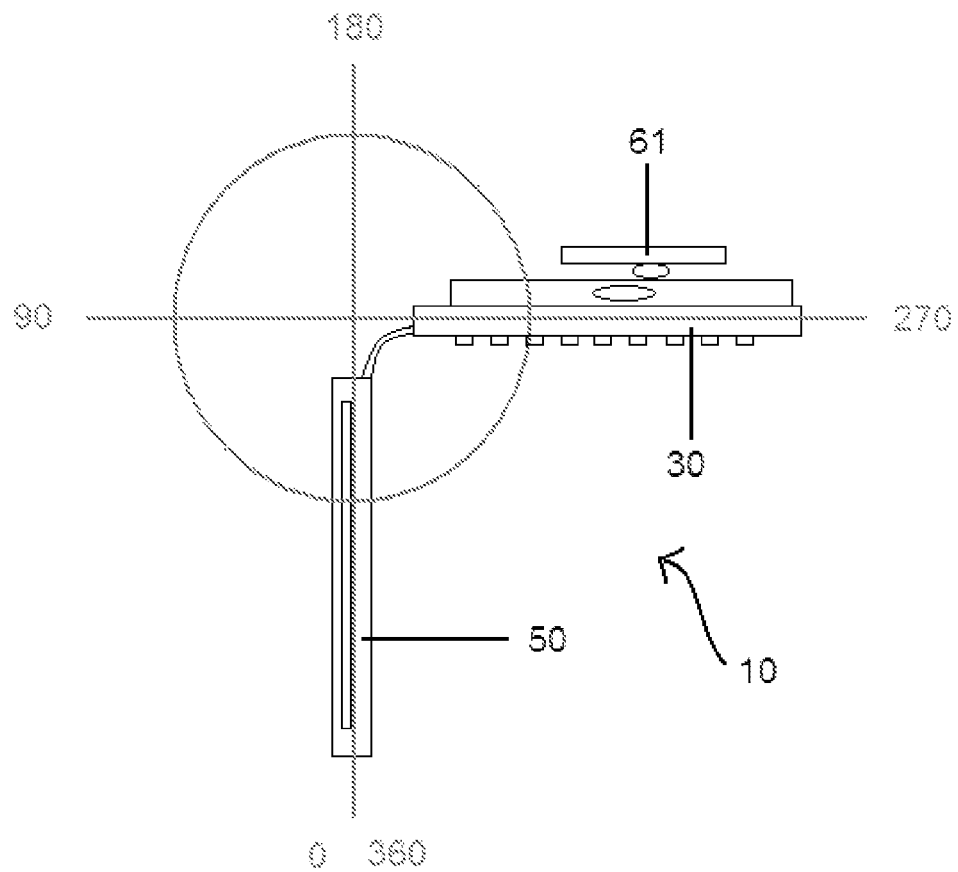
FIG. 11 is an illustrative diagram of the adjustable angles of the bar of the second embodiment of the electronic product carrier adapted to be hung on a neck of the present application.
Figure 12:
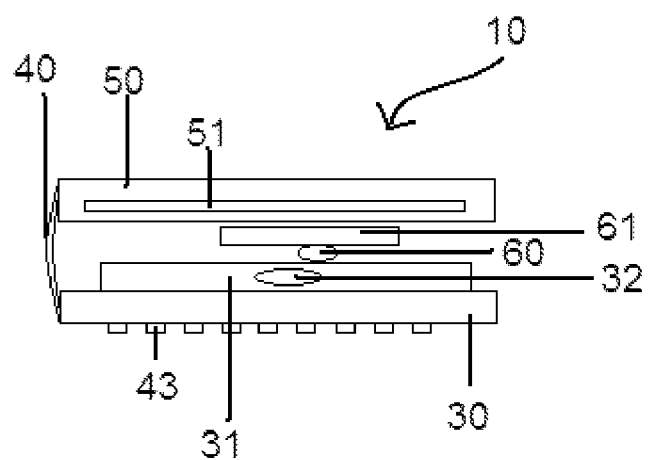
FIG. 12 is an illustrative diagram of the second embodiment of the electronic product carrier adapted to be hung on a neck of the present application in a stacked configuration.
Figure 13:
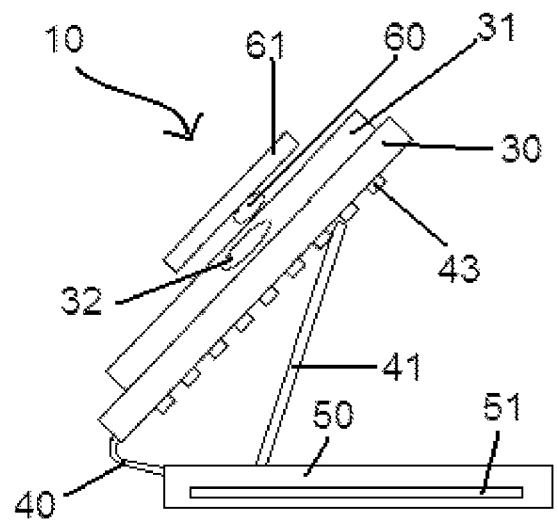
FIG. 13 is an illustrative diagram of the second embodiment of the electronic product carrier adapted to be hung on a neck of the present application in use on a flat surface.
Figure 14:
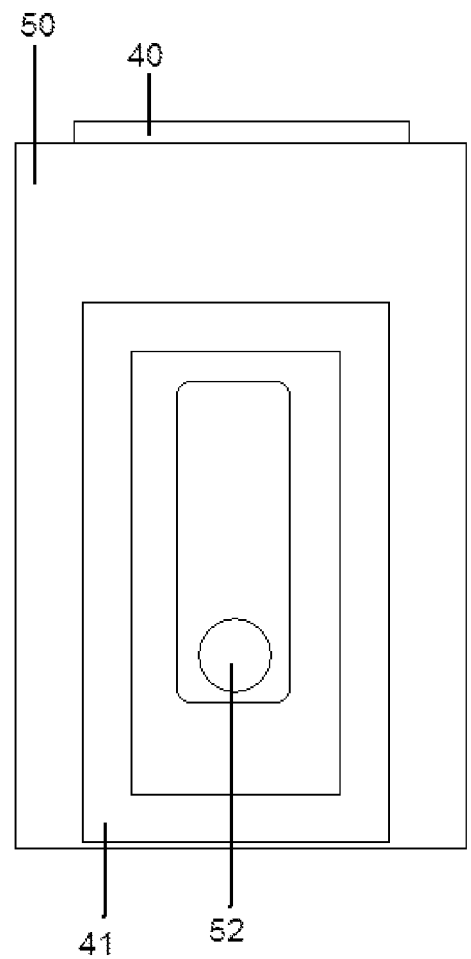
FIG. 14 is a front illustrative diagram of a base extension retracted inside the base of the second embodiment of the electronic product carrier adapted to be hung on a neck of the present application.
Figure 15:
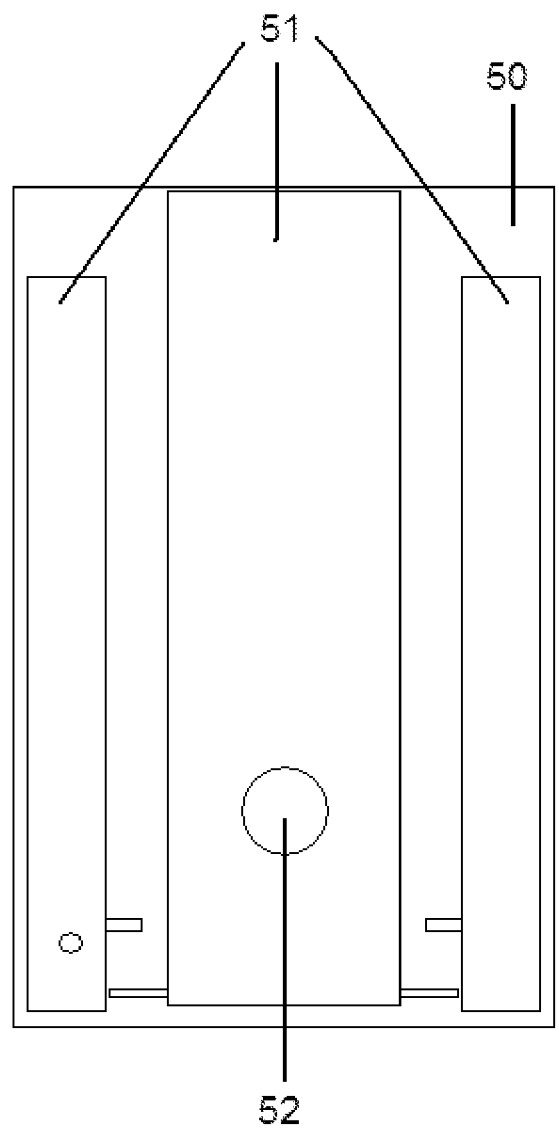
FIG. 15 is an illustrative diagram of the interior of the base with its cover being removed to show the base extension retracted inside the base of the second embodiment of the electronic product carrier adapted to be hung on a neck of the present application.
Figure 16:
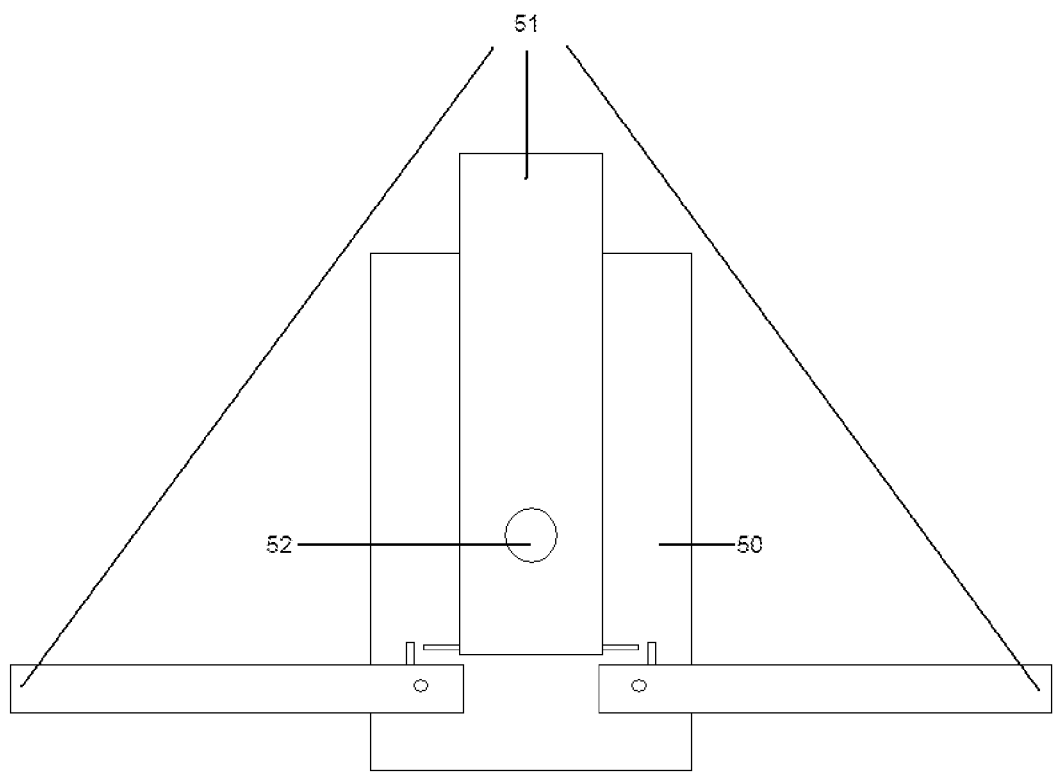
FIG. 16 is an illustrative diagram of the base extension extending outward of the second embodiment of the electronic product carrier adapted to be hung on a neck of the present application.
Figure 17:
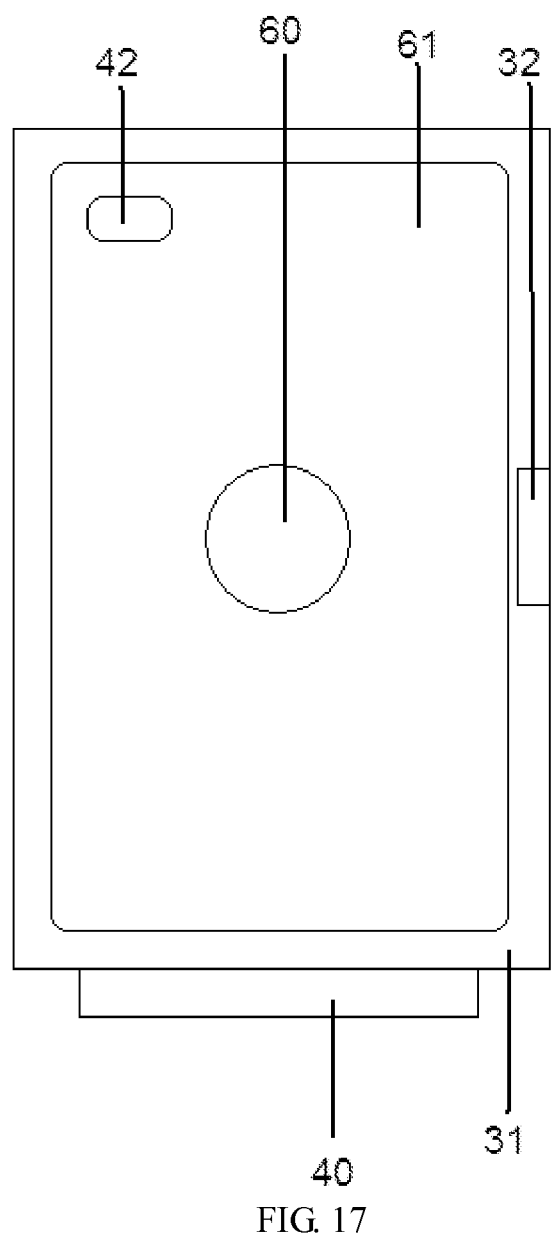
FIG. 17 is a front illustrative diagram of a bar of the second embodiment of the electronic product carrier adapted to be hung on a neck of the present application in a stacked configuration.
Figure 18:
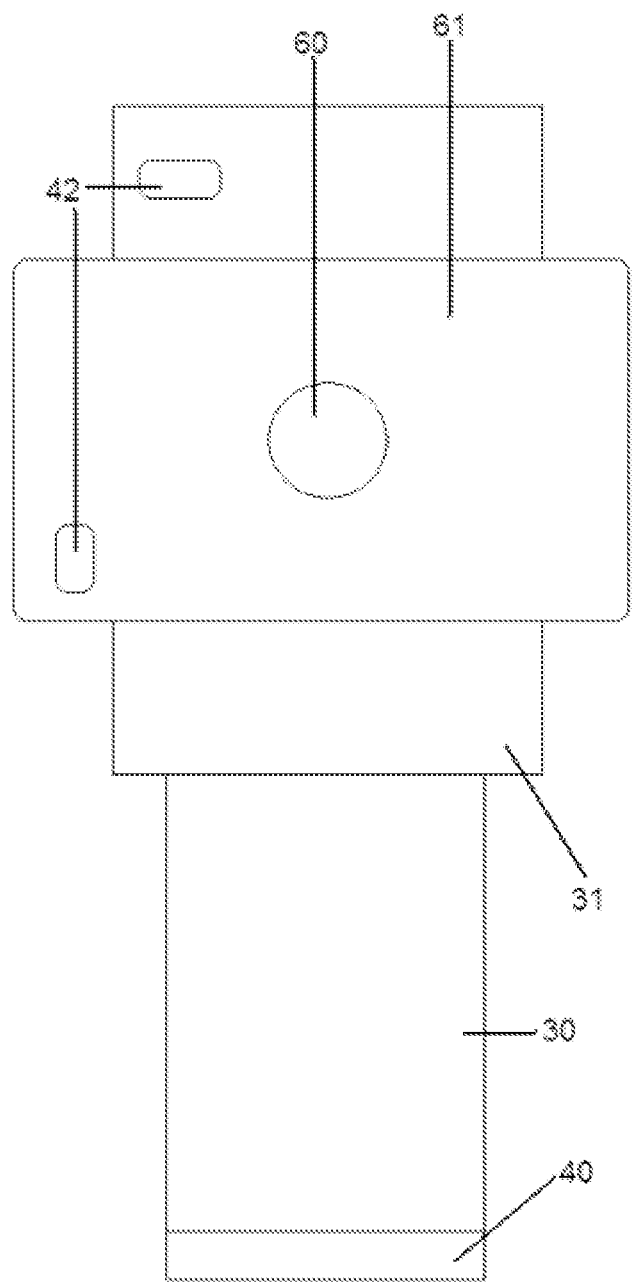
FIG. 18 is a front illustrative diagram of a bar extending to the longest distance of the second embodiment of the electronic product carrier adapted to be hung on a neck of the present application.

Referring to FIGS. 7, 8, 9, 10, 11, 12 and 13, the connecting band 40 between the bar 30 and base 50 may be made of a flexible material. As FIG. 11 illustrates, the angle between the bar 30 and the base can be changed within the range of 0° to 360° degrees. In FIG. 7, the angle between the bar 30 and base 50 is 270° degrees. The bar 30 and the base 50 both lie vertically. In FIG. 8, the angle between the bar 30 and the base 50 is 240° degrees. The length of the bar 30 is extended to the longest. The base extension 51 of the base 50 extends outward. The rotatable plate 61 and the mobile phone or tablet PC mounted thereon, or the container 70 carrying the mobile phone or tablet PC may lie horizontally. FIG. 9 is a side view of an electronic product carrier 10 of FIG. 7 after removing the neck cord 20. FIG. 10 is a side view of an electronic product carrier 10 of FIG. 9 after removing the neck cord 20. In FIG. 12, the angle between the bar 30 and the base 50 is 0° degree. As FIG. 13 illustrates, the angle between the bar 30 and the base 50 is 310° degrees.

Figure 19:
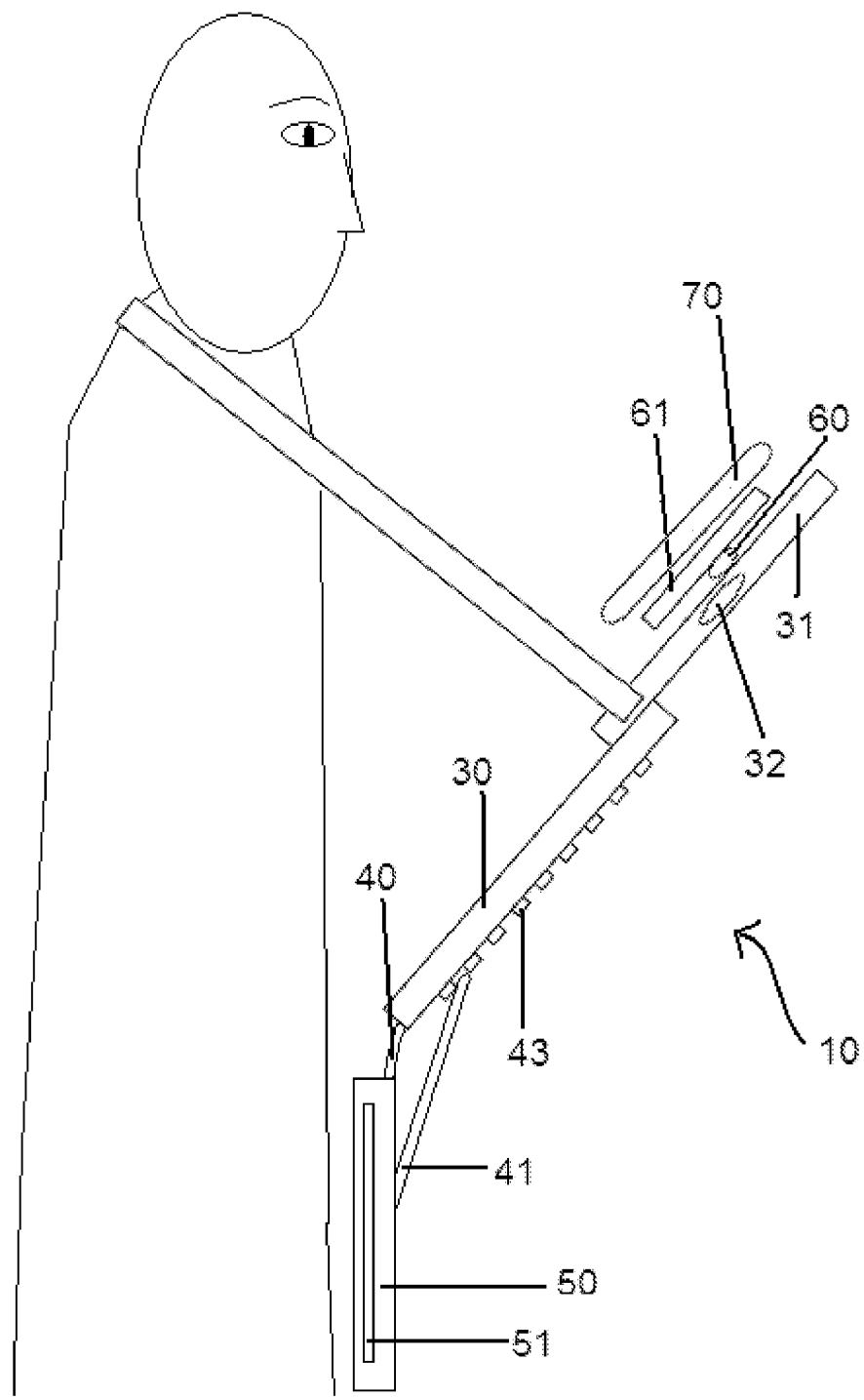
FIG. 19 is an illustrative diagram of the second embodiment of the electronic product carrier adapted to be hung on a neck of the present application in use by a user.

FIG. 19 is an illustrative diagram of an embodiment of the electronic product carrier 10 in use. The neck cord 20 is hung on the neck of a user. The base 50 may lie on the chest or abdomen of the user. The bar 30 can extend in a slanted upward direction, causing the plate assembly to be located in front of the user. The mobile phone or tablet PC, or the container 70 carrying the mobile phone or tablet PC can be placed on the rotatable plate 61 of the plate assembly, allowing the user to view the mobile phone or tablet PC without the need to hold the mobile phone or tablet PC with his/her hands. This can spare the hands of the user and enable the user to perform other tasks with his/her hands while using the mobile phone or tablet PC. The length of the bar 30 can be adjusted, and the coupling of the strut 41 and the trough 43 can be adjusted. The rotatable plate 61 can also rotate on the plate support 60. With the aid of these adjustable structures, the mobile phone or tablet PC, or the container 70 carrying the mobile phone or tablet PC can be situated in a location suitable for use by the user. When additional support is required, the base extension 51 inside the base 50 can be extended outward from the base 50. This can provide a more stable support for the electronic product carrier 10 as a whole, so as to prevent the electronic product carrier 10 from shaking during use.

Referring to FIG. 12, when the electronic product carrier 10 is not required, it can be retracted. Specifically, the strut 41 and the trough 43 can be disassembled and the bar 30 can be retracted to the shortest length. The bar 30 and the plate assembly lie vertically downward, or the base 50 can be flipped over to cover the front surface of the plate assembly. This can retract the electronic product carrier 10 so that it can occupy less space and prevent interfering with the user while performing other tasks.

Referring to FIG. 13, for the electronic product carrier 10, besides being able to be hung on the neck for use, it can also be used on a table with a supporting surface. As FIG. 13 illustrates, the base 50 can be placed on the table horizontally. The position of the strut 41 at the trough 43 of the bar 30 can be adjusted. The angle between the bar 30 and the base 50 may be at about 310° degrees. The length of the bar 30 can also be adjusted if needed. The electronic product carrier 10 can be used on a table as a support of the mobile phone or tablet PC.

Referring to FIGS. 7, 8, 17 and 18, the mobile phone or tablet PC can have some peripheral devices such as webcam, flash light, microphone, speaker, USB socket, charger socket, ear phone socket etc. In order to facilitate the use of these peripheral devices, one or more windows 42 may be provided on the bar 30 and/or the plate assembly as well as the base 50 and/or the connecting band 40. The windows 42 may be in the form of openings or transparent windows located on the bar 30 and/or the rotatable plate 61. The locations of the windows 42 correspond to the locations of the peripheral devices of the mobile phone or tablet PC. Through these windows 42, a user can conveniently use the mobile phone or tablet PC.

The electronic product carrier 10 adapted to be hung on a neck in the present application can support an electronic product such as a mobile phone or tablet PC in front of a user and does not require the user to use his/her hands to hold the mobile phone or tablet PC in front of him/her and keep the hands in a lifting position for a long period of time. This can prevent the hands, arms and shoulders of the user from stress or muscle pain due to keeping his/her hands in a lifting position for a long period of time. Further, since the user does not need to lift the mobile phone or tablet PC with his/her hands, the hands are free to perform other tasks while using the mobile phone or tablet PC.

The above describes the embodiments in the present application with reference to the drawings. However, the present application is not limited to the above specific embodiments. The above specific embodiments are merely illustrative not limitative in nature. One skilled in the art, under the motivation of the present application and without departing from the principle of the present application and protection scope of the claims, can perform many other forms which shall belong within the protection scope of the present application.

What is claimed is:

1. An electronic product carrier adapted to be hung on a neck, the electronic product carrier comprising:
    (a) a base having surface for abutting a user;
    (b) a retractable bar having a distal bar section and a proximal bar section connected to the base by a flexible connecting band;
    (c) a plate assembly independently connected to the distal bar section and having a rotatable plate for mounting thereon an electronic product; and
    (d) a neck cord adapted to be connected to the base, the bar or the connecting band;
    (e) wherein the base adapted to be rotatable about the connecting band between an in-use position and a retracted position such that in the retracted position, the base covers the plate assembly and said surface of the base abuts the electronic product.

2. An electronic product carrier adapted to be hung on a neck, the electronic product carrier comprising:
(a) a base;
(b) a bar having a distal bar section and a proximal bar section connected to the base by a connecting band, the bar further comprising additional bar sections and a bar adjusting mechanism for adjusting the length of the bar;
(c) a plate assembly connected to the distal bar section and having a rotatable plate for mounting thereon an electronic product, the plate assembly comprising a plate support being connected to the distal bar section, and the rotatable plate being rotatably mounted on and frictionally engaged with the plate support;
(d) a neck cord adapted to be connected to the base, the bar or the connecting band; and
(e) a strut and a plurality of troughs provided on a bottom surface of the bar, wherein one end of the strut is hingedly connected to the base and another end of the strut is detachably insertable into one of the troughs of the bar;
(f) wherein the base includes a base extension provided inside the base, the base extension can be retracted inside the base or extended outward from the base by a base support adjusting mechanism; and
(g) wherein one or more windows are provided on the bar and/or the rotatable plate as well as the base and/or the connecting band, and each window is in the form of an opening or a transparent window, which corresponds to a peripheral device of the electronic product.

3. An electronic product carrier adapted to be hung on a neck, the electronic product carrier comprising:
a) a base;
b) a bar having a distal bar section and a proximal bar section connected to the base by a flexible connecting band;
c) a plate assembly independently connected to the distal bar section and having a rotatable plate for mounting thereon an electronic product;
d) a neck cord adapted to be connected to the base, the bar or the connecting band;
e) a bar adjusting mechanism provided on the bar allowing the plate assembly to be movable along the longitudinal direction of the bar; and
f) a strut and a plurality of troughs provided on a bottom surface of the bar, wherein one end of the strut is hingedly connected to the base and another end of the strut is detachably insertable into one of the troughs of the bar.

4. The electronic product carrier adapted to be hung on a neck according to claim 3, wherein the base is provided with a trough in which the proximal bar section is removably inserted.

5. The electronic product carrier adapted to be hung on a neck according to claim 4, wherein the base is provided with a plurality of troughs.

6. The electronic product carrier adapted to be hung on a neck according to claim 3, wherein the bar further comprises additional bar sections.

7. The electronic product carrier adapted to be hung on a neck according to claim 6, wherein the neck cord is connected to the distal bar section.

8. The electronic product carrier adapted to be hung on a neck according to claim 3, wherein the plate assembly further comprises a hinge hingedly connected to the distal bar section, and a plate support connected to the hinge, and wherein the rotatable plate is rotatably mounted on the plate support.

9. The electronic product carrier adapted to be hung on a neck according to claim 8, wherein the hinge is frictionally engaged with the bar.

10. The electronic product carrier adapted to be hung on a neck according to claim 8, wherein the rotatable plate is frictionally engaged with the plate support.

11. The electronic product carrier adapted to be hung on a neck according to claim 3, wherein the plate assembly comprises a plate support provided at the distal bar section, and the rotatable plate is rotatably mounted on the plate support.

12. The electronic product carrier adapted to be hung on a neck according to claim 11, wherein the rotatable plate is frictionally engaged with the plate support.

13. The electronic product carrier adapted to be hung on a neck according to claim 3, further comprising a container mounted on the rotatable plate for receiving the electronic product, the container being connected to the rotatable plate by fastening or adhering.

14. The electronic product carrier adapted to be hung on a neck according to claim 3, wherein the rotatable plate is provided thereon with a connecting element for connecting the electronic product to the rotatable plate by fastening or adhering.

15. The electronic product carrier adapted to be hung on a neck according to claim 3, further comprising a strut and a plurality of troughs provided on a bottom surface of the bar, wherein one end of the strut is hingedly connected to the base and another end of the strut is detachably insertable into one of the troughs of the bar.

16. The electronic product carrier adapted to be hung on a neck according to claim 3, further comprising a strut and a plurality of troughs provided on the base, wherein one end of the strut is hingedly connected to the bar and another end of the strut is detachably insertable into one of the troughs of the base.

17. The electronic product carrier adapted to be hung on a neck according to claim 3, wherein the base further comprises a base extension provided inside the base, the base extension can be retracted inside the base or extended outward from the base.

18. The electronic product carrier adapted to be hung on a neck according to claim 17, wherein a base extension adjusting mechanism is provided on the base, the base extension adjusting mechanism is coupled with the base extension and enables the base extension to interchange between a retracted configuration where the base extension is retracted inside the base and an extended configuration where the base extension is extended outward from the base.

19. The electronic product carrier adapted to be hung on a neck according to claim 3, wherein the neck cord is detachably connected to the bar, base or connecting band.

20. The electronic product carrier adapted to be hung on a neck according to claim 3, further comprising one or more windows provided on the bar and/or the rotatable plate, and the base and/or the connecting band, wherein each window is in the form of an opening or a transparent window, which corresponds to a peripheral device of the electronic product.

* * * * *